United States Patent
Henson

(10) Patent No.: US 9,771,906 B2
(45) Date of Patent: Sep. 26, 2017

(54) ENGINE FUEL CONTROL SYSTEM

(71) Applicant: Rolls-Royce, PLC, London (GB)

(72) Inventor: Nigel Henson, Warwickshire (GB)

(73) Assignee: ROLLS-ROYCE PLC, London (GB)

( * ) Notice: Subject to any disclaimer, the term of this patent is extended or adjusted under 35 U.S.C. 154(b) by 555 days.

(21) Appl. No.: 14/295,778

(22) Filed: Jun. 4, 2014

(65) Prior Publication Data

US 2015/0027412 A1 Jan. 29, 2015

(30) Foreign Application Priority Data

Jul. 23, 2013 (GB) .................................. 1313142.0

(51) Int. Cl.
| | |
|---|---|
| *F02M 45/12* | (2006.01) |
| *F02C 7/236* | (2006.01) |
| *F02C 7/262* | (2006.01) |
| *F02C 9/26* | (2006.01) |
| *F02C 9/46* | (2006.01) |

(52) U.S. Cl.
CPC ............. *F02M 45/12* (2013.01); *F02C 7/236* (2013.01); *F02C 7/262* (2013.01); *F02C 9/26* (2013.01); *F02C 9/263* (2013.01); *F02C 9/46* (2013.01); *F05D 2260/84* (2013.01); *F05D 2270/051* (2013.01); *F05D 2270/09* (2013.01); *F05D 2270/301* (2013.01); *F05D 2270/44* (2013.01)

(58) Field of Classification Search
CPC .. F02C 9/263; F02C 7/22; F02C 7/232; F02C 7/236; F02C 7/222
See application file for complete search history.

(56) References Cited

U.S. PATENT DOCUMENTS

| | | | |
|---|---|---|---|
| 5,927,064 A | 7/1999 | Dyer et al. | |
| 6,079,198 A | 6/2000 | Prowse et al. | |
| 6,619,027 B1 | 9/2003 | Busch | |
| 6,745,556 B2 | 6/2004 | Elliott | |
| 7,137,242 B2 | 11/2006 | Griffiths | |
| 7,337,761 B2 | 3/2008 | Bickley | |
| 2005/0262824 A1* | 12/2005 | Yates | F02C 7/232 |
| | | | 60/39.281 |
| 2006/0130455 A1* | 6/2006 | Griffiths | F02C 7/228 |
| | | | 60/39.281 |

(Continued)

FOREIGN PATENT DOCUMENTS

| | | |
|---|---|---|
| CA | 999924 A1 | 11/1976 |
| EP | 0 388 046 | 9/1990 |

(Continued)

*Primary Examiner* — Gerald L Sung
*Assistant Examiner* — Marcos O Diaz
(74) *Attorney, Agent, or Firm* — Oliff PLC

(57) ABSTRACT

An engine fuel control system includes a fuel metering valve operable to control the flow of fuel between a supply line and a delivery line. The delivery line is configured to receive fuel from one or more fuel pumps. The engine fuel control system further includes a pressure raising arrangement which receives the fuel flow from the delivery line and raises the fuel pressure therein. The engine fuel control system further includes a pressure sensor arranged to sense the pressure of the fuel in the supply line between the one or more fuel pumps and the fuel metering valve, or to sense the pressure of the fuel in the delivery line between the fuel metering valve and the pressure raising arrangement.

15 Claims, 8 Drawing Sheets

(56) References Cited

U.S. PATENT DOCUMENTS

| | | | |
|---|---|---|---|
| 2007/0144246 A1* | 6/2007 | Flint | F02C 9/263 73/112.01 |
| 2008/0163931 A1 | 7/2008 | Brocard et al. | |
| 2009/0313966 A1 | 12/2009 | Vanderleest et al. | |
| 2011/0146823 A1* | 6/2011 | Griffiths | F02C 7/232 137/625.48 |
| 2012/0167594 A1 | 7/2012 | Poisson et al. | |

FOREIGN PATENT DOCUMENTS

| | | |
|---|---|---|
| EP | 1 355 054 A2 | 10/2003 |
| EP | 2 184 466 A2 | 5/2010 |
| EP | 2 339 147 A2 | 6/2011 |
| GB | 2 451 144 | 1/2009 |

\* cited by examiner

ENGINE FUEL CONTROL SYSTEM

FIELD OF THE INVENTION

The present invention relates to an engine fuel control system and in particular to a fuel control system for use in controlling the supply of fuel to a gas turbine engine.

BACKGROUND OF THE INVENTION

A typical fuel control system for use in controlling the supply of fuel to an aircraft engine comprises a metering valve operable to control the rate at which fuel passes from a supply line to a delivery line. A pressure drop control arrangement, for example comprising a pressure drop control valve and an associated spill valve, is operable to maintain a substantially constant pressure drop across the metering valve. A pressure raising and shut-off valve (PRSOV) controls the passage of fuel from the delivery line to a burner manifold, the PRSOV serving, in use, to maintain a minimum fuel pressure in a part of the fuel control system upstream thereof, so as to ensure that any fuel pressure operated devices arranged to receive fuel under pressure from the fuel control system can operate correctly.

The fuel control system receives fuel under pressure from a pumping unit that is driven by, and so operates at a speed related to the operating speed of, the associated engine. There is a need to provide, within the fuel control system, a mechanism whereby thrust can be controlled in the event of an overthrust condition arising. The scenario where a fuel control (i.e. fuel metering valve) fails, causing an upward runaway of engine thrust, is referred to as "thrust control malfunction" or "overthrust". The un-commanded increase in thrust on one engine leads to a thrust imbalance (or thrust asymmetry) on the aircraft. The default response of a typical existing fuel control to an upward runaway is to shut-down the engine in order to protect the engine from overspeed induced failure. More recent aircraft and engine design combinations have arisen for which engine shut-down is not an acceptable response to thrust control malfunction at all flight conditions. At some flight conditions (i.e. landing approach) the flight crew may not be able to safely control a thrust asymmetry in one direction whilst the thrust asymmetry rapidly reverses (due to engine shut-down) and acts in the opposite direction. A means is therefore required to bring upward runaway failures under control, by maintaining operation and thrust from the faulty engine, rather than initiating shut-down of that engine.

A number of thrust control management, commonly known as thrust control malfunction accommodation (TCMA), systems to perform this function are known. For example U.S. Pat. No. 6,745,556 describes a TCMA system in which a control valve is operable to relieve the fuel pressure applied to one end of a metering valve with the result that the metering valve moves to a low or minimum fuel delivery position to allow fuel supply to the associated engine burner to be reduced. One of the arrangements described in U.S. Pat. No. 7,137,242 uses ports provided on a staging valve to allow the pressure at the inlet of the metering valve to be reduced in the event of an overthrust condition being sensed. U.S. Pat. No. 6,619,027 describes an arrangement in which an electrically controlled servo valve allows the operation of the spill valve to be modified, and in which the operation of a shut-off valve can be controlled. U.S. Pat. No. 5,927,064 describes a fuel system incorporating an overspeed governor to control the operation of a spool valve in response to engine speed and thereby control or manage overspeed conditions, EP 2339147 A describes a TCMA device operating in conjunction with a pressure drop control arrangement for a metering valve. The device comprises a control servo-valve which ensures that engine control can be maintained in the event of an overthrust condition in which fuel is delivered to a burner manifold at a rate higher than is desired, and also provides a mechanism whereby sufficient fuel can be delivered to the burner manifold under windmill relight conditions at which the engine is rotating at a relatively low speed.

SUMMARY OF THE INVENTION

It would be desirable to provide improved fuel flow management, e.g. in the event of an engine overthrust event such as may be caused by malfunction of a fuel metering valve. Accordingly, in general terms, the present invention provides an engine fuel control system in which a pressure sensor is arranged to sense the pressure of fuel on a supply line to a fuel metering valve or a delivery line from such a valve. The sensed pressure can be used to improve fuel flow management. However, the present invention is at least partly based on the realisation that the sensed fuel pressure can be used for other applications, such as engine health monitoring.

Accordingly, in a first aspect the present invention provides an engine fuel control system (such as a gas turbine engine fuel control system) including:
 a fuel metering valve operable to control the flow of fuel between a supply line and a delivery line, the supply line being configured to receive fuel from one or more fuel pumps,
 a pressure raising arrangement which receives the fuel flow from the delivery line and raises the fuel pressure therein, and
 a pressure sensor arranged to sense the pressure of the fuel on the supply line between the one or more fuel pumps and the fuel metering valve, or arranged to sense the pressure of the fuel on the delivery line between the fuel metering valve and the pressure raising arrangement.

Advantageously, the sensed pressure can be used e.g. by an engine controller (such as an engine electronic controller or EEC) to control the engine, by a health monitor to monitor the health of the fuel control system (and in particular the health of one or more fuel pumps of the system), and/or by some other type of control/diagnostic/protective device. Control of the engine by the engine controller can include taking corrective action to safeguard the engine and/or aircraft if control elements of the controller fail. The protection elements of an engine controller which take such corrective action can be implemented as an independent and/or physically separate unit from the control elements of the controller.

In a second aspect the present invention provides a gas turbine engine (e.g. an aircraft engine) having the engine fuel control system of the first aspect.

Optional features of the invention will now be set out. These are applicable singly or in any combination with any aspect of the invention.

The pressure raising arrangement may be a pressure raising valve, such as a pressure raising and shut-off valve. The pressure raising arrangement may direct the fuel flow from the delivery line to e.g. an engine burner manifold line.

The supply line may be configured to receive fuel from a small displacement fuel pump and a large displacement fuel pump, the supply line having a branch from the small displacement fuel pump and a branch from the large displacement fuel pump, and conveniently the pressure sensor being arranged to sense the pressure of the fuel in the branch from the large displacement fuel pump.

According to another option, the supply line may be configured to receive fuel from a single fuel pump.

The engine fuel control system may further include an engine controller which uses the sensed fuel pressure to detect an upward runaway event in the fuel flow to the engine, and implements an upward runaway curtailing procedure when an upward runaway event is detected. For example, when the engine is a gas turbine engine, the upward runaway curtailing procedure can be part of a thrust control malfunction accommodation procedure, for example as described in U.S. Pat. No. 7,137,242 or EP 2339147 A. The upward runaway curtailing procedure typically modifies the normal functioning of the engine fuel control system e.g. in order to reduce the flow of fuel from the delivery line. The engine controller may detect the upward runaway event on the basis of the value of the sensed fuel pressure (absolute or relative to a datum such as a pump inlet pressure) and/or the rate of change of the sensed fuel pressure. The engine controller may further implement an engine control recovery procedure (e.g. after the implementation of the upward runaway curtailing procedure) using the sensed fuel pressure as an indication of fuel flow. Such an engine control recovery procedure can also be part of a thrust control malfunction accommodation procedure. The engine control recovery procedure typically modifies the normal functioning of the engine fuel control system, e.g. in order to control the output of power from the engine. The engine controller may further receive an indicator of engine power output as a measure of engine overthrust, and use the indicator of engine power output in the implementation of the engine control recovery procedure. For example, when the engine is a gas turbine engine, the indicator of engine power output can be a shaft rotational speed of the engine. This can be measured directly, or indirectly e.g. from a fuel pump speed. Another option is for the indicator of engine power output to be a pressure ratio of the engine.

The engine fuel control system may further include an engine controller (which can be the same controller as that which detects an upward runaway event) which has an engine windmill relight procedure in which the engine controller determines a desired fuel delivery rate, and controls the fuel metering valve to provide a nominal fuel delivery rate which is higher than that corresponding to the desired fuel delivery rate, the engine controller using the sensed fuel pressure to determine the nominal fuel delivery rate. For example, EP 2339147 A describes control of a fuel metering valve to provide a nominal fuel delivery rate which is higher than that corresponding to a desired fuel delivery rate for windmill relight. The approach of EP 2339147 A can be modified to use the sensed fuel pressure to determine the nominal fuel delivery rate. Advantageously, this allows the engine controller to more accurately determine the amount by which the nominal fuel delivery rate should be higher than the desired fuel delivery rate during windmill relight and subsequent engine acceleration, and also allows it to take account of any reduction in pumping performance of the one or more fuel pumps, e.g. caused by wear.

The engine fuel control system may further include an engine controller (which can be the same controller as that which detects an upward runaway event and/or has an engine windmill relight procedure) which uses the sensed fuel pressure to detect a blockage in a fuel delivery line.

When a blockage is detected, the controller can also implement a pressure reduction procedure to avoid excessive pressure in the delivery line.

The engine fuel control system may further include a pump health monitor which uses the sensed fuel pressure to determine the health of at least one of the fuel pumps. In particular, when the delivery line has a branch from a small displacement fuel pump and a branch from a large displacement fuel pump and the pressure sensor senses the pressure in the branch from the large displacement fuel pump, the pump health monitor may use the sensed fuel pressure to determine the health of the large displacement fuel pump. Indeed, more indirectly, the pump health monitor may also use the sensed fuel pressure to determine the health of the small displacement fuel pump. However, when there is only a single fuel pump, the pump health monitor may use a fuel pressure sensed on the supply line or on the delivery line to determine the health of the fuel pump. Either way, the performance of the pump(s) can be tracked and appropriate adjustments made to fuel flow management strategies. Also, the monitor can improve scheduling of repair or replacement of the pump(s).

The engine fuel control system may further include a pressure drop control arrangement operable to regulate a pressure drop across the fuel metering valve, the pressure drop control arrangement maintaining in normal operation a substantially constant pressure drop across the metering valve. The pressure drop control arrangement may comprise a spill valve and a pressure drop control valve. The spill valve and pressure drop control valve may be separate components or may be combined in a single valve. The spill valve may include a control chamber and be operable to alter the fuel flow through the supply line and thence through the metering valve. The pressure drop control valve can be operable to vary the spill valve control chamber pressure, thereby opening or closing the spill valve as required to alter the fuel flow through the supply line and the metering valve, and maintaining in normal operation the substantially constant pressure drop across the metering valve. The delivery line may be configured to receive fuel from a plurality of fuel pumps, and the spill valve may be a combining spill valve, operable to supply fuel to the supply line from the plurality of fuel pumps.

Further optional features of the invention are set out below.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES OF THE INVENTION

Figure 1:
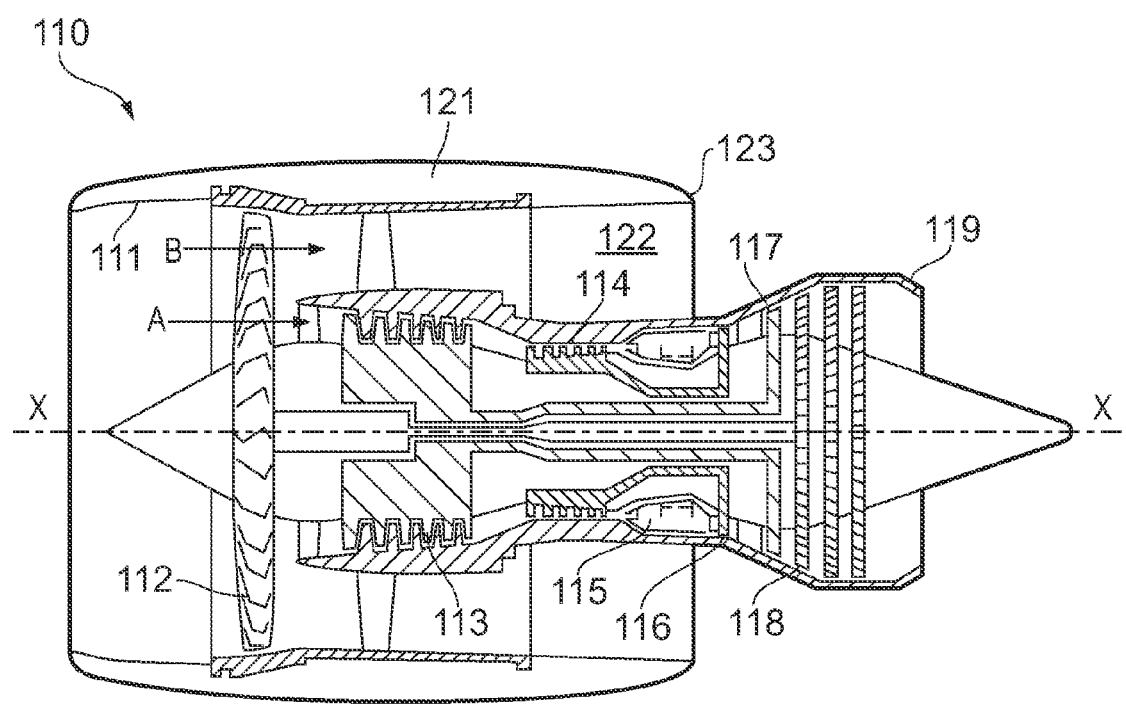
FIG. 1 shows a longitudinal section through a ducted fan gas turbine engine.

With reference to FIG. 1, a ducted fan gas turbine engine incorporating the invention is generally indicated at 110 and has a principal and rotational axis X-X. The engine comprises, in axial flow series, an air intake 111, a propulsive fan 112, an intermediate pressure compressor 113, a high-pressure compressor 114, combustion equipment 115, a high-pressure turbine 116, and intermediate pressure turbine 117, a low-pressure turbine 118 and a core engine exhaust nozzle 119. A nacelle 121 generally surrounds the engine 110 and defines the intake 111, a bypass duct 122 and a bypass exhaust nozzle 123.

During operation, air entering the intake 111 is accelerated by the fan 112 to produce two air flows: a first air flow A into the intermediate pressure compressor 113 and a second air flow B which passes through the bypass duct 122 to provide propulsive thrust. The intermediate pressure compressor 113 compresses the air flow A directed into it before delivering that air to the high pressure compressor 114 where further compression takes place.

The compressed air exhausted from the high-pressure compressor 114 is directed into the combustion equipment 115 where it is mixed with fuel and the mixture combusted. The resultant hot combustion products then expand through, and thereby drive the high, intermediate and low-pressure turbines 116, 117, 118 before being exhausted through the nozzle 119 to provide additional propulsive thrust. The high, intermediate and low-pressure turbines respectively drive the high and intermediate pressure compressors 114, 113 and the fan 112 by suitable interconnecting shafts.

Figure 2:
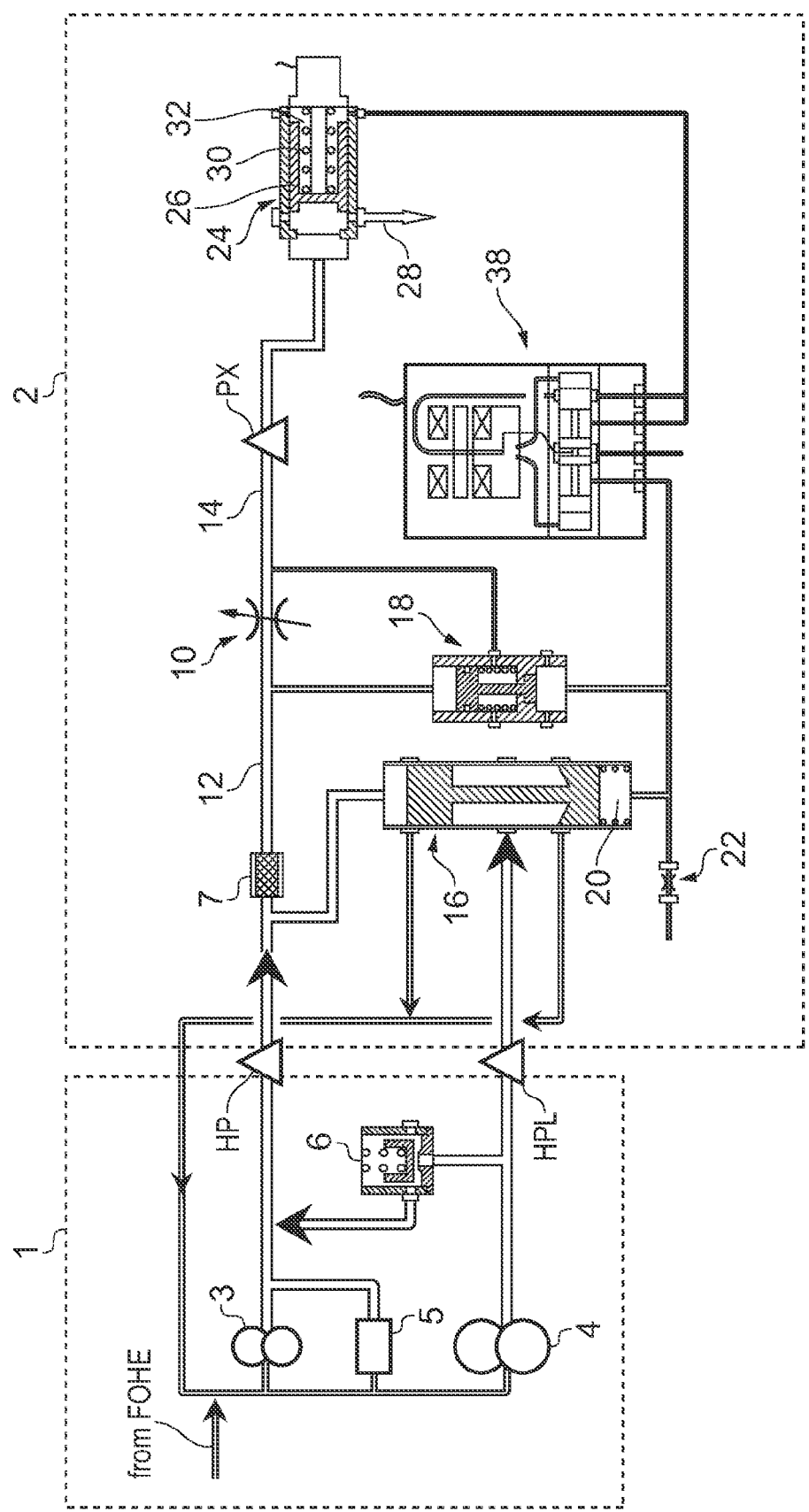
FIG. 2 is a diagram illustrating a high pressure pumping stage and part of a hydro-mechanical unit of a fuel control system for the engine of FIG. 1.

A fuel control system of the engine has a pumping unit comprising a low pressure (LP) pumping stage (not shown) which draws fuel from a fuel tank of the aircraft and supplies the fuel at boosted pressure to the inlet of a high pressure (HP) pumping stage 1, which is illustrated diagrammatically in FIG. 2. The LP stage typically comprises a centrifugal impeller pump while the HP pumping stage 1 may comprise one or more positive displacement pumps, e.g. in the form of twin pinion gear pumps. In the example of FIG. 2, the HP pumping stage 1 has a small displacement fuel pump 3 and a parallel large displacement fuel pump 4. However, many other forms for the HP pumping stage 1 are possible and the invention is not restricted in this regard. For example, the pumping unit can comprise an arrangement of one or more variable displacement pumps, such as vane pumps or piston pumps, or can comprise any combination of fixed and variable displacements pumps.

The LP and HP stages are typically connected to a common drive input, which is driven by the engine HP shaft via an engine accessory gearbox. The inter-stage flow between the LP and HP pumping stages is typically used to cool engine lubrication oil in a fuel/oil heat exchanger (FOHE—not shown).

Not all the fuel exiting the HP pumping stage 1 may be burnt in the engine. A substantial proportion may be recirculated back to the pumping unit, as described in more detail below. For example, when the engine is operating at altitude where the engine burns little fuel, there may be significant fuel recirculation, raising the temperature of the fuel in the pumping system.

A part of a hydro-mechanical unit (HMU) 2 of the fuel control system for the engine is also illustrated diagrammatically in FIG. 2. The small 3 and large 4 fuel pumps feed respective branches of a supply line 12 of the HMU, which comprises a metering valve 10 operable to control the rate at which fuel is allowed to flow from the supply line 12 to a delivery line 14. Servo-valve offtake flows (not shown) may be taken via a flow washed filter 7 which can be provided on the supply line 12. The HP pumping stage 1 has a relief valve 5 which prevents excess pressure build up in the supply line 12 in the event of a downstream blockage e.g. caused by coking of fuel in the engine fuel manifold. The HP pumping stage 1 also has a non-return valve 6 which allows fuel exiting the large fuel pump 4 to combine in the supply line 12 with fuel exiting the small fuel pump 3. In this way, the small fuel pump 3 can supply fuel directly to the metering valve 10, while the output of the large fuel pump 4 can be supplied to the metering valve 10 only when there is a high demand for fuel.

The HMU further comprises a pressure drop control arrangement which is connected to the supply line 12 and metering valve 10 and is operable to maintain a substantially constant pressure drop across the metering valve 10. The pressure drop control arrangement comprises a spill valve 16 and a pressure drop control valve 18.

The spill valve 16 is connected to the supply line 12 and is operable to allow fuel to pass from the supply line 12 to the low pressure side of the fuel pumping unit, thus altering the fuel flow through the supply line 12 and the metering valve 10. The spill valve 16 is a combining spill valve and further serves to control whether or not the output from the large fuel pump 4 is supplied to the supply line 12. Combining spill valves are well known, and so the manner in which it operates to achieve this function is not described here.

The pressure drop control valve 18 monitors the pressure drop across the metering valve 10 and controls the fuel pressure applied to a spill valve control chamber 20 of the spill valve 16 to control the operation of the spill valve 16. The manner in which the pressure drop control valve 18 operates is such that, if the pressure drop across the metering valve 10 is greater than a predetermined value, then the pressure drop control valve 18 reduces the fuel pressure within the spill valve control chamber 20. By reducing the fuel pressure within the spill valve control chamber 20, the spill valve 16 opens to allow fuel flow to be diverted from the supply line 12 to the low pressure side of the HP pumping stage 1 at an increased rate, thereby reducing the fuel flow through, and hence the pressure drop across, the metering valve 10. If the pressure drop across the metering valve 10 becomes too small, then the operation of the pressure drop control valve 18 is such that the fuel pressure within the spill valve control chamber 20 will rise by virtue of a restricted connection 22 to high pressure. The increase in the fuel pressure within the spill valve control chamber 20 urges the spill valve 16 towards a closed position reducing the rate at which fuel flow is diverted from the supply line 12 to the low pressure side of the HP pumping stage 1 with the result that the fuel flow through, and hence the fuel pressure drop across, the metering valve 10 increases.

Figure 3:
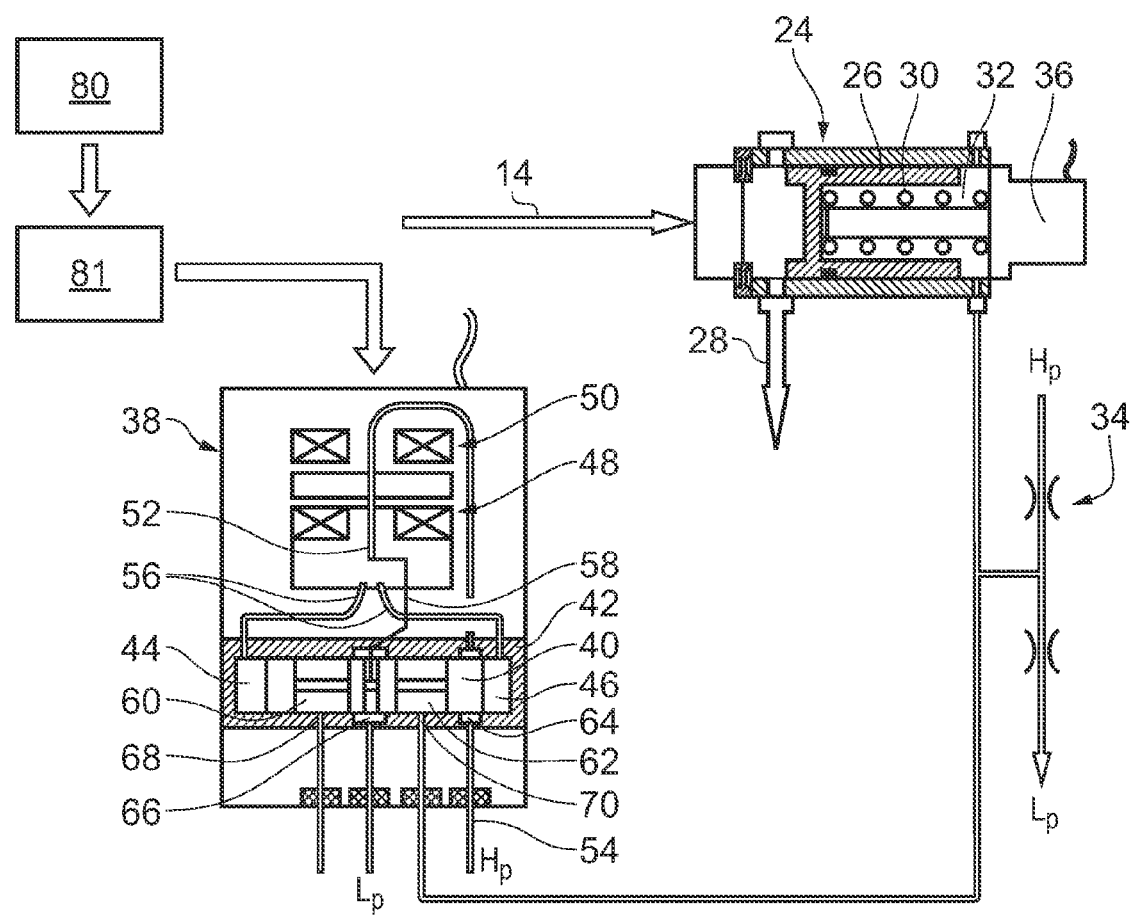
FIG. 3 is an enlarged view illustrating two of the valves within the part of the hydro-mechanical unit of FIG. 2.

A pressure raising and shut-off valve (PRSOV) 24 is connected to the delivery line 14. The PRSOV 24 comprises a valve member 26 slidable within a bore between a closed position in which the PRSOV 24 prevents fuel delivery from the delivery line 14 to a line 28 connected to the burner manifold of the engine, and an open position in which such fuel flow is permitted. The valve member 26 is biased by a spring 30 towards the closed position. The PRSOV 24 further comprises a PRSOV control chamber 32 to which fuel at a pressure governed by a fuel pressure potentiometer network 34 is supplied, as illustrated in FIG. 3. It will be appreciated that the fuel pressure within the PRSOV control chamber 32 assists the spring 30 in urging the valve member 16 towards its closed position. A position sensor 36 in the form of an inductive probe is operable to sense the position of the valve member 26. In normal use, the PRSOV 24 serves to ensure that the fuel pressure within the delivery line 14, and hence within the parts of the fuel system upstream thereof, is maintained at above a predetermined minimum level. The level at which the minimum pressure is set is dependent upon the forces applied to valve member 26 urging the valve member 26 in its closing direction. By ensuring that a predetermined minimum pressure level is maintained in the fuel system, it will be appreciated that the correct operation of any fuel pressure operated auxiliary devices (such variable inlet guide vane or variable stator vane actuators) that receive fuel under pressure from the fuel system can be maintained.

It is desirable to be able to ensure that engine control can be maintained in the event of an overthrust condition in which fuel is delivered to the burner manifold at a rate higher than is desired. Accordingly, the fuel system includes a control servo valve 38. This control servo-valve could comprise any one of a number of known electro-magnetically actuated progressive type valve arrangements, such as a torque motor actuated flapper, nozzle and spool valve arrangement or a progressive solenoid actuated clevis type valve arrangement. The preferred embodiment of the valve described hereafter is a two stage servo-valve comprising a torque motor actuated jet and nozzle first stage that affects the operation of a spool valve second stage, but many different control servo-valve architectures can be used.

The control-servo valve 38 comprises a spool 40 slidable within a bore formed in a housing 42. The spool 40 defines, with the housing 42 first and second chambers 44, 46, the fuel pressures within which are determined by the operation of an electro-magnetic controlled jet and nozzle first stage 48. The first stage 48 comprising a torque motor 50 operable to vary the position of a jet 52 supplied with fuel at high pressure from a line 54. The jet 52 is movable such that fuel under high pressure therefrom can be directed towards one or other of a pair of nozzles 56 associated with respective ones of the chambers 44, 46. In use, when the torque motor 50 is operated to move the jet 52 towards the left as illustrated in FIG. 3, it will be appreciated that the fuel pressure within the chamber 44 will rise thereby urging the spool 40 towards the right, fuel from the chamber 46 escaping therefrom to permit such movement. Operation of the torque motor 50 to urge the jet 52 in the opposite direction will result in movement of the spool 40 towards the left as illustrated in FIG. 3.

Use of a jet and nozzle first stage is advantageous in that it ensures that the second stage spool valve is maintained in a mid-position, commonly referred to as a null position, during normal operation of the fuel system. Further, blockage of the first stage jet and nozzle assembly by, for example, fuel borne debris does not result in the second stage spool 40 being forced away from the null position.

A resilient feedback spring 58 is connected between the jet 52 and the spool 40, the spring 58 being arranged to move the jet 52 to a position related to the position of the spool 40 when the torque motor 50 is not energised with the result that the de-energisation of the torque motor 50 results in the spool 40 being restored to a null position as described below. The feedback spring 58 is selected such that, when the torque motor 50 is energised, the feedback spring 58 can flex to allow movement of the spool 40 independently of the jet 52. Instead of using a feedback spring 58, connected between the jet 52 and the spool 40, to provide null-position resetting functionality in the design of the control servo-valve 38, separate resilient springs could be added to both ends of the spool 40, located in the respective chambers 44, 46, to provide the same functionality.

One of the advantages of using the form of control servo-valve 38 described above is that the second stage spool valve is actively controlled in a mid-position rather than being hard over on an end stop. Since the control servo-valve 38 only operates occasionally during flight, it is advantageous to have the second stage dithering around a control point, rather than being static, so as to avoid seizure due to silting or lacquering.

The spool 40 is provided with first and second annular galleries 60, 62, with high and low pressure connection ports 64, 66 connected, respectively, to parts of the fuel system at high and low pressure, with a port 68 connected to the spill valve control chamber 20, and with a port 70 connected to the PRSOV control chamber 32. The positioning of the ports and the dimensions of the annular galleries 60, 62 are such that the gallery 60 is in constant communication with the port 68 and the gallery 62 is in constant communication with the port 70 irrespective of the position of the spool 40. When spool 40 occupies its null position as shown in FIG. 3, the high and low pressure ports 64, 66 are closed, and the galleries 60, 62 communicate only with the respective ports 68, 70. In this position of the spool 40, it will be appreciated that the control servo valve 38 has no effect upon the operation of the fuel system. In this mode of operation, the pressure drop control valve 18 serves to maintain a substantially uniform pressure drop across the metering valve 10, controlling the operation of the spill valve 16 to achieve this, and the PRSOV 24 operates to maintain the fuel pressure within the control system at above a minimum pressure value. The metering valve 10 operates to control the rate at which fuel is delivered by the fuel system to the manifold of the associated engine and thus controls the operation of the associated engine.

Figure 4:
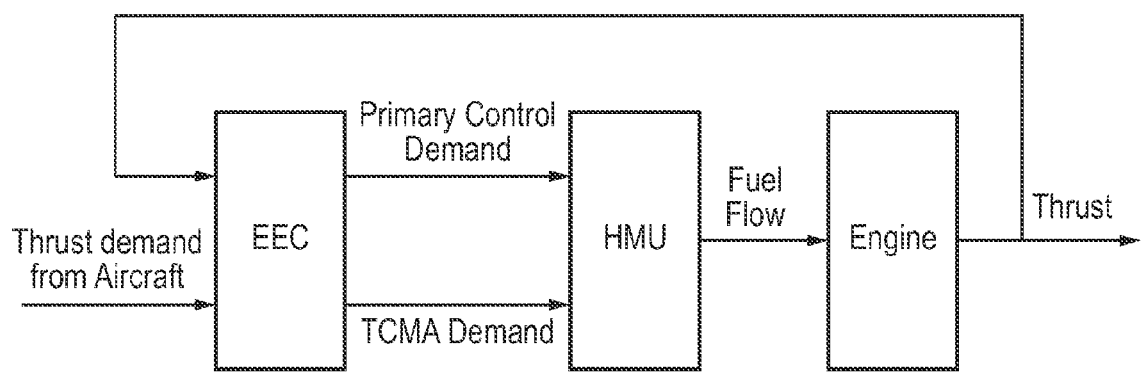
FIG. 4 is an overview block diagram showing the relationship between an electronic engine controller (EEC), a hydro-mechanical unit (HMU) of the fuel system, and the engine.

If it is determined that fuel is being delivered to the associated engine at too great a rate with the result that an overthrust condition has arisen (e.g. because of a failure such as a sticking metering valve 10), then the control servo valve 38 may be used to reduce the rate of fuel supply independently of the operation of the metering valve 10. In order to achieve this, the control servo valve 38 is operated in a thrust control mode in which the spool 40 is moved to a thrust control position by controlling the operation of the torque motor 50 to move the jet 52 towards the left as illustrated, thereby increasing the fuel pressure within the chamber 44 and causing movement of the spool 40 to the right in the orientation illustrated. FIG. 4 is an overview block diagram showing how the electronic engine controller (EEC) sends a primary control demand or, if necessary, a thrust control malfunction accommodation (TCMA) demand to the HMU.

The movement of the spool 40 and jet 52 in opposite directions results in the spring 58 being stressed, and the position of the jet 52 will be dependent upon both the level of the current applied to the torque motor 50 and the force exerted by the spring 58. Provided that the spool 40 moves by only a relatively small distance, the movement of the spool results in communication being established between the gallery 60 and the low pressure port 66, with the result that the fuel pressure within the spill valve control chamber 20 is reduced. Reduction of the fuel pressure within the spill valve control chamber 20 results in the spill valve 16 moving in the opening direction, increasing the rate at which fuel is able to escape from the supply line 12 to the low pressure side of the pump, and hence reducing the rate at which fuel flows from the supply line 12 to the delivery line 14 through the metering valve 10. The rate at which fuel is supplied to the associated engine is thus also reduced. The overthrust condition can thus be appropriately managed. Further, by appropriate control of the torque motor 50, the spool position and hence the degree of communication between the gallery 60 and the low pressure port 66 can be controlled, thus the fuel pressure within the spill valve control chamber 20, and hence the operation of the spill valve 16 can be controlled to achieve fuel delivery to the associated engine at a desired rate. The control of the control servo valve 38 in the thrust control mode is described in more detail below.

During the thrust control mode of operation, the gallery 62 remains isolated from the high and low pressure ports 64, 66 and so operation of the PRSOV is unchanged. However, in an extreme condition when it is necessary to shut-down the engine independently of the normal shut-down arrangement, or if testing of the operation of the fuel system is taking place, then the torque motor 50 may be controlled in such a manner as to move the spool 40 to an extreme right hand, test position in which not only is communication established between the gallery 60 and the low pressure port 66, but also communication is established between the gallery 62 and the high pressure port 64. In such circumstances, it will be appreciated that high pressure fuel is supplied from a high pressure line 54 via the high pressure port 64, the gallery 62 and the port 70 to the PRSOV control chamber 32, increasing the fuel pressure therein to a level higher than is achieved by the normal operation of the fuel pressure potentiometer network 34. Increasing the fuel pressure within the PRSOV control chamber 32 in this manner, results in the force on the valve member 26 being increased to a level sufficient to move the valve member 26 to its closed position, thereby terminating the delivery of fuel to the associated engine manifold, which results in engine shut-down. The movement of the valve member 26 is sensed by the sensor 36 and can thus be used to provide an indication that the control servo valve 38 is operating correctly. It is recognised that the control servo-valve 38 could be designed such that in the thrust control mode it is capable of opening the spill valve 16 far enough to reduce the system pressure rise to a level that prevents the PRSOV from opening at start-up. Hence, the high pressure port 64 and line 54 would not be required to test the operation of the control servo-valve 38, although it is recognised that they may still be required to provide engine shut-down capability through operation of the control servo-valve 38 independently of the normal shut-down arrangement. Alternatively, a dedicated position sensor associated with the control servo-valve 38, for example monitoring movement of the spool 40, could be used to confirm correct operation. Further, the described two-stage control servo-valve 38 could be replaced by an arrangement comprising a single stage servo-valve in the form of, for example, a torque motor actuated flapper and nozzle assembly, which controls an independent second stage spool valve.

In either the thrust control mode or shut-down mode of operation, when the spool 40 has been moved as a result of the operation of the torque motor 50, upon de-energisation of the torque motor 50 the spring 58 will force the jet 52 to move to a position related to the position of the spool 40. As a result of such movement, it will be appreciated that fuel under high pressure is delivered by the jet 52 to the other of the nozzles 56 with the result that the fuel pressure within the chamber 46 is increased, moving the spool 40 towards the left. This spool movement results in the spring 58 forcing the jet 52 to return to a null position between the two nozzles 56. When the spool 40 reaches its null position, as illustrated in FIG. 3, spool movement will cease as the pressures applied to the chambers 44, 46 will be substantially equal.

A further advantage of the thrust control mode of operation of the control servo-valve 38 is that the low pressure port 66 is closed off from the port 70 to the PRSOV control chamber 32, and consequently the minimum system pressure rise, is set by the fuel pressure potentiometer network 34 at a relatively high level. This ensures correct operation of fuel pressure operated auxiliary devices, and in particular engine variable geometry actuators, during an overthrust event. This would somewhat offset the reduction in system pressure rise that would be expected if the cause of the overthrust was an upward runaway of the metering valve 10.

As discussed in EP 2339147 A, the control servo valve 38 can also be used to provide a windmill relighting capability.

Advantageously, the control servo valve 38 is hydro-mechanically simple. Its control logic uses engine shaft speed as an indicator of engine power output. However, this control parameter has a slow time constant. Thus the operation of the control servo valve 38 can be enhanced by providing its control logic with more direct feedback of the state of the fuel control or the amount of fuel passing to the engine. In particular, a pressure sensor located on the high pressure fuel line, either upstream of the metering valve 10 on the supply line 12 or downstream of the metering valve 10 on the supply line 14, can provide the feedback to improve the response and precision of the control. In FIG. 2 possible positions of the sensor are indicated by triangles labeled respectively Px, HP and HPL.

The absolute pressure measured by the pressure sensor is the sum of the engine combustion chamber inlet pressure (typically referred to as P30 or P3) and the pressure raised across restrictions downstream of the metering valve 10, such as the engine burner manifolds and the PRSOV 24. In general, the pressure does not need to be measured very accurately as the control transients are large, but preferably it should be measured quickly as the control transients can be rapid.

The pressures measured at HP and Px are quite similar. The pressure measured at HPL is preferred for pumping units having the dual gear pump arrangement shown in FIG. 2.

Figure 5:
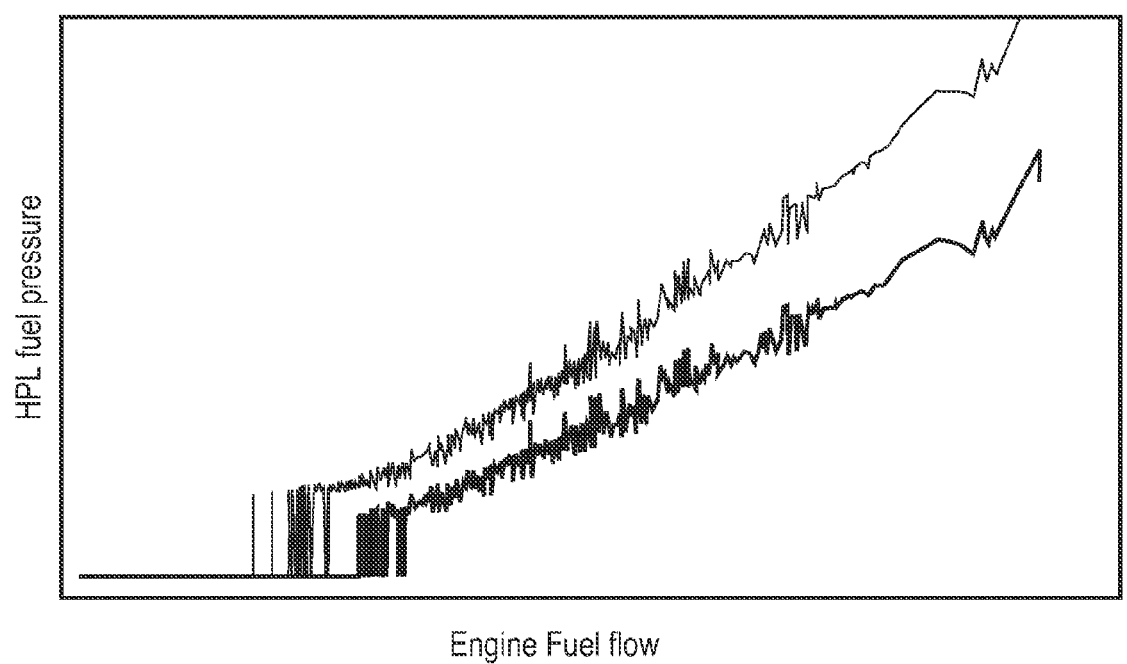
FIG. 5 is a graph of measured fuel pressure against engine fuel flow for a full range of operating conditions.

FIG. 5 shows a graph of sensed HPL fuel pressure against engine fuel flow for a full range of operating conditions. At the higher fuel flows equating to overthrust conditions of interest, there is a strong relationship between engine fuel flow and the sensed fuel pressure. The HPL characteristic also has a distinct "kink" at the transition from low to mid-range fuel flows, which can be used to determine if the fuel flow rate is pulled back too far.

The graph demonstrates some variability, but, for higher fuel flows, the basic relationship permits estimation of actual engine fuel flow directly from the sensed fuel line pressure, and/or estimation of rate of change of actual fuel flow from the rate of change of the sensed pressure. A large degree of the variability arises from changes in the flow number of the downstream restrictions over time due to, for example, fuel lacquer accumulation. Additional measurements of fuel pump speed, P30 and optionally metered fuel flow (while the control system is fault free and fuel flow measurements are valid), used in conjunction with a model of the fuel control, permit these life related variations to be tracked and compensated for in the algorithms estimating metered fuel flow from fuel pressure, thereby improving the accuracy of estimate if desired.

As indicated schematically in FIG. 3, measurements made by a suite of sensors/detectors 80 can be used by an engine controller 81 (which may be part of the EEC) to detect and control an engine overthrust event. For example, as well as the sensed high pressure fuel line pressure, the suite 80 can directly or indirectly (e.g. or via a fuel pump speed) monitor a shaft rotational speed. In particular, an upward runaway event in the fuel flowing through the metering valve (which may in turn lead to an overthrust event), can be detected swiftly by the sensed fuel line pressure. On detection of the upward runaway event, the controller 81 can apply a pullback current to the control servo-valve 38. For example, in the thrust control mode of operation the position of the spool 40 may be adjusted by varying the current applied to the torque motor 50 of the electro-magnetically controlled first stage 48 of the control servo-valve 38. This will control the spill valve control chamber pressure and thereby achieve proportional control over the fuel delivery rate independently of the metering valve 10. The sensed fuel line pressure and the shaft rotational speed can then be used to provide engine control recovery via closed loop control over the pullback current.

Figure 6:
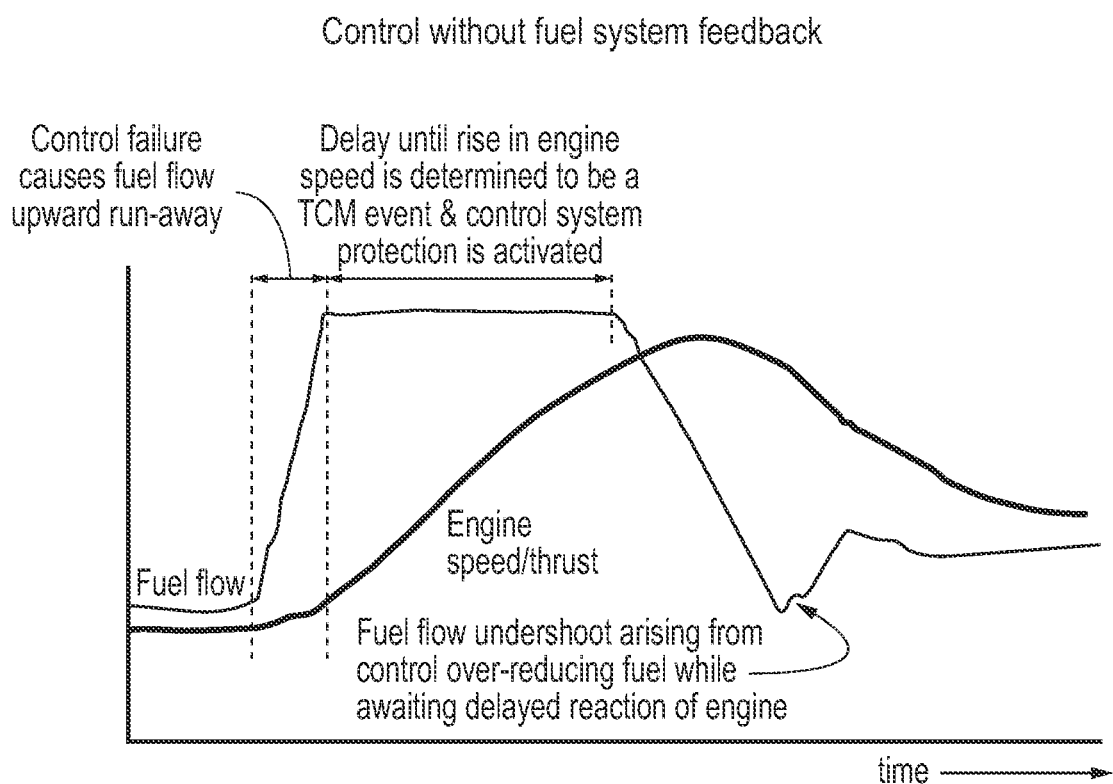
FIG. 6 shows schematically plots of fuel flow and engine speed/thrust against time for an overthrust event caused by a fuel flow upward runaway and ultimately controlled by activation of a TCMA procedure introduced after the overthrust event is detected via monitoring of engine speed.
Figure 7:
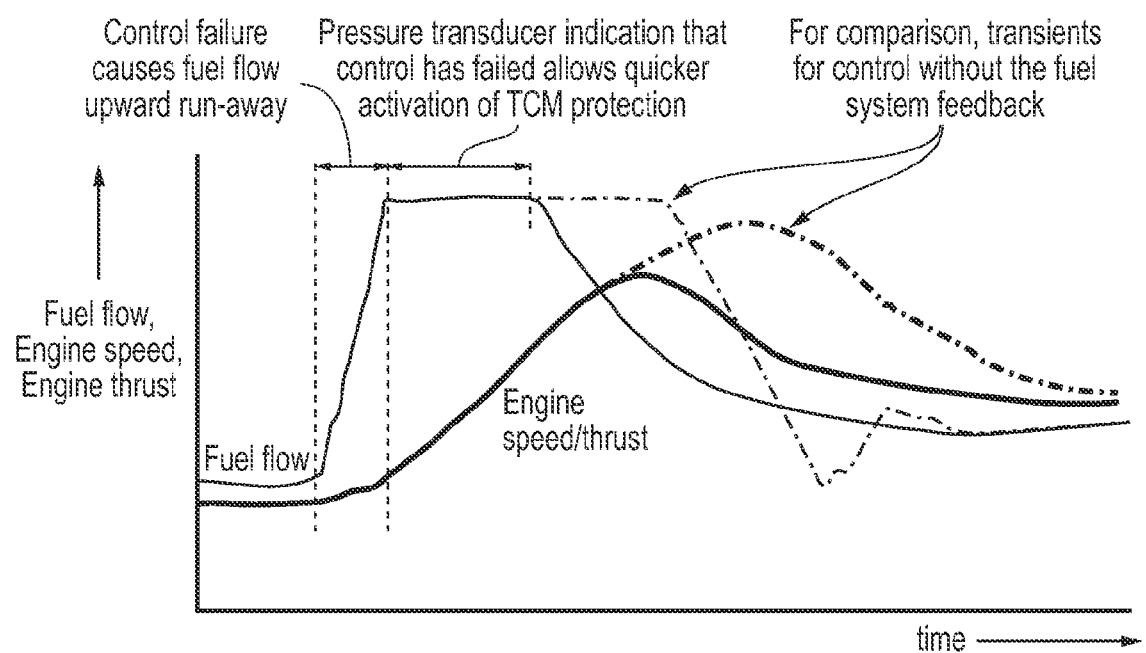
FIG. 7 shows schematically plots of fuel flow and engine speed/thrust against time for an overthrust event caused by a fuel flow upward runaway and ultimately controlled by activation of a TCMA procedure introduced after the overthrust event is detected via sensing of the fuel line pressure.

FIG. 6 shows schematically plots of fuel flow and engine speed/thrust against time for an overthrust event caused by a fuel flow upward runaway and ultimately controlled by activation of a TCMA procedure introduced after the overthrust event via monitoring of engine speed. There is a significant delay during which fuel is over-supplied to the engine before the TCMA procedure is activated. This leads to a high peak in the engine speed and a significant fuel flow undershoot after TCMA procedure activation while the control logic awaits a delayed reaction from the engine. In contrast, FIG. 7 shows schematically plots of fuel flow and engine speed/thrust against time for an overthrust event caused by a fuel flow upward runaway and ultimately controlled by activation of a TCMA procedure introduced after the overthrust event is detected via sensing of the high pressure fuel line pressure. The delay during which fuel is over-supplied to the engine is substantially decreased, and as a result the peak engine speed and the fuel flow undershoot are reduced.

Thus the enhanced thrust control management protection control logic embedded within the controller 81 can use the sensed pressure as an early indication that the actual fuel flow to the engine is deviating from the fuel flow commanded by the EEC. A simple way to achieve this is by detection that the fuel pressure measurement has exceeded a threshold relative to the expected fuel pressure. For those rapid fuel control upward runaway failures which present the greatest danger to the engine, large increases in the fuel pressures occur very rapidly, and are easily detectable with this approach.

For failure mechanisms where metered flow indication is the cause of upward runaway, the controller 81 can additionally compare a fuel flow estimate based on the sensed pressure with an indicated flow measurement, or can compare an estimated rate of change of fuel flow fuel based on the rate of change of the sensed pressure with a rate of change of the indicated flow measurement. Typically the metering valve 10 contains a piston which is moved to increase or decrease flow, the position of the piston thus providing the "indicated flow measurement". A more complex detection method can be achieved by modeling engine thrust from a fuel flow estimate based on the sensed pressure and comparing this, or its rate of change, with the engine thrust command. In all these cases, the sensed fuel line pressure can promote improved detection times for upward flow runaway.

During the recovery of engine control, the sensed high pressure fuel line pressure can be further used to provide absolute and/or relative indication of the actual fuel flow to the engine. For example, with the sensed pressure being used as an absolute indication of fuel flow, the spill valve 16 is opened, via control of the control servo valve 38, to reduce fuel flow until the fuel line pressure sensor indicates that the flow level is back at a level which is safe for aircraft handling. With the sensed pressure being used as a relative indication of fuel flow, the fuel flow is reduced in this way until the sensed pressure matches that just prior to the onset of the overthrust event as retrieved from a recording buffer in the controller 81.

The pressure sensor located on the high pressure fuel line can provide operational benefits in addition to, or separately from, improved overthrust detection and control.

For example, the pressure sensor can be used to monitor fuel pump life in the HP pumping stage 1. As each fixed displacement pump wears, less pumped flow is provided for a given pump shaft speed and back pressure. The pump speed can be calculated from engine parameters in the engine controller 81, or it can be directly measured. The demanded fuel flow to the engine is also known and fuel off-takes for actuators can be determined from sensors, and/or model algorithms embedded within the EEC operating software. Measurement of high pressure fuel line pressure can complete the information required for a pump health monitoring algorithm.

For a fuel system application with a single fixed displacement pump, a pressure sensor located at HP or Px enables pump health monitoring.

In the arrangement illustrated in FIG. 2 (with twin fixed displacement pumps) a pressure transducer located at HPL enables health monitoring of the large displacement fuel pump 4 when it is actively supplying fuel to the engine. Measurement of HPL pressure also allows detection of the fuel system conditions for which the small displacement fuel pump 3 requires assistance from the large displacement fuel pump 4, enabling the health/wear of the small displacement fuel pump 3 to be monitored.

The pressure sensor can also be used to extend the life of the control system as the HP stage fuel pumps 3, 4 wear. In particular, as fixed displacement pumps wear they reach a point where there are no longer able to meet engine windmill light-up flow requirements for a given back pressure that is set by the downstream control elements.

A known solution to this problem is to over-travel the metering valve 10 (demanding a nominal flow that is higher than the desired flow) in order to reduce back pressure on the pump (as explained in EP 2184466 A). At conditions where the HP stage fuel pump(s) cannot meet flow requirements, the spill valve 16 is already fully closed. Opening the metering valve 10 does not therefore directly cause an increase in fuel flow, but its larger orifice size results in a lower pressure drop between the supply 12 and delivery 14 lines, causing a reduction in the pressure rise created by the fuel pump(s) and less pump flow lost to internal leakages. However, a limitation of this known approach is that there has been no means of determining when the fuel pump(s) have degraded to a level that requires over-travel of the metering valve 10. Additionally as pump speed increases for an ignited engine, the pump performance rapidly increases, leading to potential over-fuelling if the metering valve 10 remains in an over-travel position. Thus conventionally, the fuel control logic has no direct means of determining the required level of metering valve over-travel during windmill re-light and initial acceleration of the engine.

Figure 8:
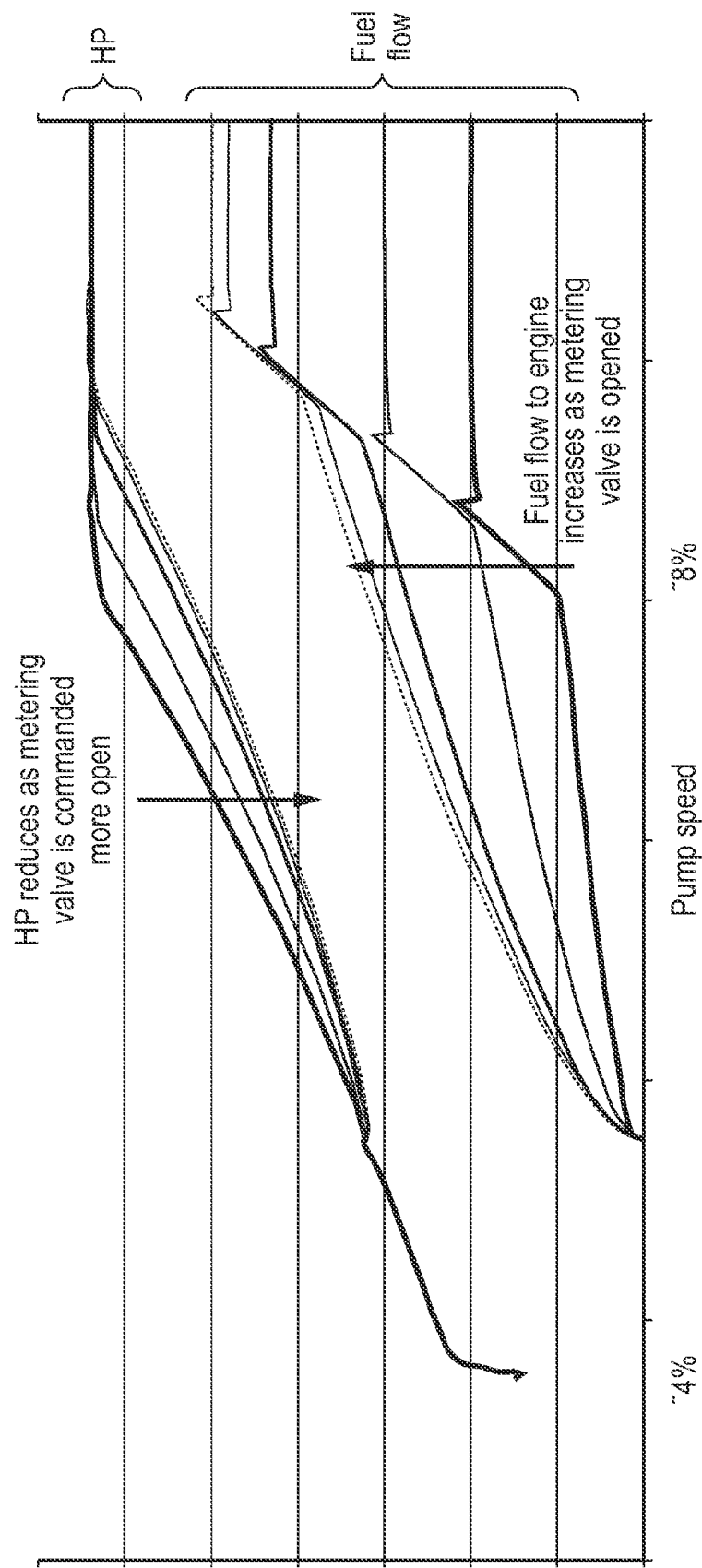
FIG. 8 shows schematically plots of fuel flow and sensed high pressure fuel line pressure (HP) against HP stage pump speed for different over-travel positions of the metering valve of the fuel control system of FIG. 2.

FIG. 8 shows schematically plots of fuel flow and sensed high pressure fuel line pressure (HP) against HP stage pump speed for different over-travel positions of the metering valve 10 of the HMU of FIG. 2. In each case the flow capability of the pump increases with pump speed, until the point where the pump is capable is supplying the flow commanded by the metering valve whereupon the fuel flow plateaus at the demanded level. The fuel line pressure measurement appears to flatten at a lower pump speed than flow, but is in effect rising slowly as the pressure regulator and spill valves crack open and travel to their nominal operating design points. Looking at the pump speeds between the black arrows marked on the plot (i.e. in the region where the pump cannot supply commanded flow), as metering valve over-travel increases there is a decrease in sensed pressure and an increase in the fuel flow to the engine. This illustrates a mechanism by which the increased fuel flow to the engine can be achieved with a pump which is incapable of supplying that flow with the control system operating in its normal mode. A potential difficulty arises in determining how much fuel is passing to the engine given that the flow capability of a partially worn pump will not normally be known to the controller 81 and that the metering valve is being intentionally commanded to a higher flow setting than that actually required. As pump speed increases the pump flow capability rapidly improves. If the flow passing to the engine is unknown, the metering valve overtravel can quickly lead to overfuelling of the engine. However, the use of the pressure sensor alleviates this difficulty.

While the system is operating at a low flow condition with pumps that can supply the required flow, an increase in commanded metering valve position causes no appreciable change in the high pressure fuel line pressure. This is set by the pressure raising arrangement and the regulated pressure drop across the metering valve 10. The pressure sensor therefore provides a means for the controller 81 to determine whether, at a particular pump speed the pumps are meeting the metering valve demand (pressure reading does not change with increased commanded fuel flow) or whether the pumps are worn in which case fuel pressure will reduce as the metering valve is opened.

For windmill relight flow scheduling, the pressure sensor can be used in a variety of ways. The pump health can be continuously monitored throughout its life as described above, and characterized in terms of its degree of pump wear. Alternatively or additionally, at the windmill relight condition a specific test to modulate the metering valve to map the pressure raised against commanded fuel flow can determine the flow capability of the pump at the exact conditions of the windmill relight attempt. Regardless of which method is used to establish the health/wear state of the pump(s), this information can be used by the controller 81 to overtravel the metering valve (if necessary) to offset pump wear. For example, the controller can make use of pre-determined maps or algorithms which describe the flow delivered by the system with respect to metering valve schedule and pump speed for different degrees of pump wear. Having characterized the level of pump wear/health, the controller schedules metering valve overtravel based on the map or algorithm appropriate for the level of pump wear. The required overtravel reduces with pump speed until overtravel becomes zero and control reverts to the normal schedule.

For the two pump system described in FIG. 2, during windmill relight mode a pressure sensor located at the output of large fuel pump 4 (measuring HPL) would function in the same way as a pressure transducer located at the output of the small fuel pump 3 (measuring HP) since the non-return valve 6 is open at windmill relight conditions and the two pump outputs are connected.

Another benefit of the pressure sensor is that it can be used to determine when blockage of the fuel delivery line to the engine has occurred, for example due to the coking of fuel in the engine fuel manifold.

More particularly, conventional fuel control systems are designed to operate with worst case conditions, as blockage of the fuel lines is not detectable. As a result, hydro-mechanical units are conventionally rated to operate at elevated pressures substantially above normal operating pressures. However, detection of excessive levels of blockage through use of the pressure sensor can facilitate trending analysis and identification of blockage problems, allowing timely preventative maintenance. In addition, high pressure fuel systems are typically protected with a mechanical pressure relief valve (e.g. valve 5 in the HP pumping stage 1 of FIG. 2). Monitoring of pump delivery fuel pressures by the pressure sensor in combination with features such as the independently-actuated spill valve function, as implemented for thrust control malfunction protection, and the PRSOV valve 24, can make the relief valve 5 redundant, allowing it to be deleted.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

All references referred to above are hereby incorporated by reference.

The invention claimed is:

1. An engine fuel control system including:
   a fuel metering valve operable to control the flow of fuel between a supply line and a delivery line, the supply line being configured to receive fuel from one or more fuel pumps,
   a pressure raising arrangement which receives the fuel flow from the delivery line and raises the fuel pressure therein,
   a pressure sensor located downstream of the one or more fuel pumps and upstream of the fuel metering valve to sense the pressure of the fuel on the supply line, or located downstream of the fuel metering valve and upstream of the pressure raising arrangement to sense the pressure of the fuel on the delivery line, and an engine electronic controller configured to detect an upward runaway event using the fuel pressure sensed by the pressure sensor, and implement an upward runaway curtailing procedure when the upward runaway event is detected.

2. The engine fuel control system according to claim 1, wherein the one or more fuel pumps comprise a small displacement fuel pump and a large displacement fuel pump, the supply line having a branch from the small displacement fuel pump and a branch from the large displacement fuel pump, and the pressure sensor is located in the branch from the large displacement fuel pump to sense the pressure of the fuel on the supply line.

3. The engine fuel control system according to claim 1 further including a health monitor which uses the sensed fuel pressure to monitor the health of the fuel control system.

4. The engine fuel control system according to claim 1, wherein the engine controller detects the upward runaway event on the basis of the value of the sensed fuel pressure and/or the rate of change of the sensed fuel pressure.

5. The engine fuel control system according to claim 1, wherein the engine controller further implements an engine control recovery procedure using the sensed fuel pressure as an indication of fuel flow.

6. The engine fuel control system according to claim 5, wherein the engine controller further receives an indicator of engine power output as a measure of engine overthrust, and uses the indicator of engine power output in the implementation of the engine control recovery procedure.

7. The engine fuel control system according to claim 1, wherein the or another engine electronic controller implements an engine windmill relight procedure in which the or the another engine electronic controller determines a desired fuel delivery rate, and controls the fuel metering valve to provide a nominal fuel delivery rate which is higher than that corresponding to the desired fuel delivery rate, the or the another engine electronic controller using the sensed fuel pressure to determine the nominal fuel delivery rate.

8. The engine fuel control system according to claim 1, wherein the or the another engine electronic controller uses the sensed fuel pressure to detect a blockage in the delivery line.

9. The engine fuel control system according to claim 3, including a pump health monitor which uses the sensed fuel pressure to determine the health of at least one of the fuel pumps.

10. The engine fuel control system according to claim 9, wherein the one or more fuel pumps comprise a small displacement fuel pump and a large displacement fuel pump, the supply line having a branch from the small displacement fuel pump and a branch from the large displacement fuel pump, and the pressure sensor is located in the branch from the large displacement fuel pump to sense the pressure of the fuel on the supply line, the pump health monitor using the sensed fuel pressure to determine the health of the large and the small displacement fuel pumps.

11. The engine fuel control system according to claim 1 further including a pressure drop control arrangement operable to regulate a pressure drop across the fuel metering valve, the pressure drop control arrangement maintaining, during a normal operation, a substantially constant pressure drop across the metering valve.

12. The engine fuel control system according to claim 11, wherein the pressure drop control arrangement comprises a pressure drop control valve and a spill valve.

13. The engine fuel control system according to claim 12, wherein the delivery line is configured to receive fuel from the one or more fuel pumps, wherein the spill valve is a combining spill valve, operable to supply fuel to the supply line from the one or more fuel pumps.

14. The engine fuel control system according to claim 1, wherein the engine is a gas turbine engine.

15. A gas turbine engine having the engine fuel control system of claim 1.

* * * * *